United States Patent [19]

Matsuo

[11] Patent Number: 4,727,813

[45] Date of Patent: Mar. 1, 1988

[54] LINEAR INDUCTION PROPELLED TRACK GUIDED RUNNER

[75] Inventor: Yukito Matsuo, Yokohama, Japan

[73] Assignee: Kabushiki Kaisha Toshiba, Kawasaki, Japan

[21] Appl. No.: 822,235

[22] Filed: Jan. 24, 1986

[30] Foreign Application Priority Data

Jan. 26, 1985 [JP] Japan .................................. 60-13200
Jan. 26, 1985 [JP] Japan .................................. 60-13201

[51] Int. Cl.⁴ .............................................. B60L 13/02
[52] U.S. Cl. ........................................ 104/290; 104/90
[58] Field of Search ................. 104/88, 287, 288, 289, 104/290, 292, 299, 90; 105/26 R, 90 R, 90 A, 50

[56] References Cited

U.S. PATENT DOCUMENTS

| | | | |
|---|---|---|---|
| 3,610,159 | 10/1971 | Fickenscher | 104/88 |
| 3,675,585 | 7/1972 | Wiart et al. | 104/290 |
| 3,834,316 | 9/1974 | Hennings | 104/290 |
| 3,874,305 | 4/1975 | Sema et al. | 105/26 R |
| 3,926,128 | 12/1975 | Zappel | 105/90 A |
| 3,974,778 | 8/1976 | Black et al. | 104/292 |
| 4,113,114 | 9/1978 | Pounds | 105/26 R |
| 4,440,092 | 4/1984 | Sabolewski | 104/291 |

FOREIGN PATENT DOCUMENTS 3029216 2/1982 Fed. Rep. of Germany ...... 104/292
59-34541 9/1984 Japan .

Primary Examiner—Robert B. Reeves
Assistant Examiner—Glenn D. Foster
Attorney, Agent, or Firm—Finnegan, Henderson, Farabow, Garrett & Dunner

[57] ABSTRACT

A transport apparatus is provided with a track including a predetermined transport path, a first runner adapted to travel on the transport path when subjected to an external impelling force, and a plurality of stators arranged at predetermined intervals along the transport path and adapted to produce changes of magnetic field, whereby an impelling force is applied to the first runner for moving. The transport apparatus in further provided with a second runner adapted to be transported on the transport path by a driving force from built-in transport mechanism.

14 Claims, 15 Drawing Figures

LINEAR INDUCTION PROPELLED TRACK GUIDED RUNNER

BACKGROUND OF THE INVENTION

The present invention relates to a transport apparatus in which a runner is driven or stopped by a forward or reverse impelling force applied externally.

Among the conventional apparatuses of this type is a transport apparatus using a linear induction motor. In this apparatus, a reaction plate is attached to the runner, and stators as impelling force exerting means are arranged at predetermined intervals along a transport path of the runner. The stators are energized by a power supply unit so that magnetic flux, which changes with time, is applied to the reaction plate. The change of the magnetic flux produces a forward or reverse fixed impelling force to the reaction plate, thereby driving or stopping the runner.

If the power supply for the stators is out of order due to power failure or an operator's mistake, the runner will possibly stop at a position halfway between two adjacent stators. In such a position, the runner will not be able to be started by an impelling force.

Conventionally, therefore, the runner is returned to any of predetermined positions corresponding to the stators by the following methods.

(1) When the power supply is restored, the stopped runner is removed from the transport path by means of another runner which is subjected to the impelling force from the stators.

(2) The middle portion of the transport path is located higher than the predetermined positions corresponding to the stators so that the runner is moved to and stopped at one such predetermined position by gravity.

(3) The runner is moved manually.

In methods (1) and (3), it takes much time and labor to return the stopped runner to a position from which it can start. On the other hand, method (2) prohibits a free layout of the transport path.

SUMMARY OF THE INVENTION

The present invention is contrived in consideration of these circumstances, and is intended to provide a transport apparatus which can easily and quickly return a first runner to a position for starting if the runner is stopped at a position from which it cannot restart due to power failure or wrong operation, thus greatly saving the operator of trouble and ensuring a compact design.

DETAILED DESCRIPTION OF THE PREFERRED EMBODIMENTS

One embodiment of the present invention applied to a transport apparatus using a linear induction motor will now be described in detail with reference to the accompanying drawings of FIGS. 1 to 9.

First, there will be described the transport apparatus for a runner which is driven by an external impelling force.

Figure 1:
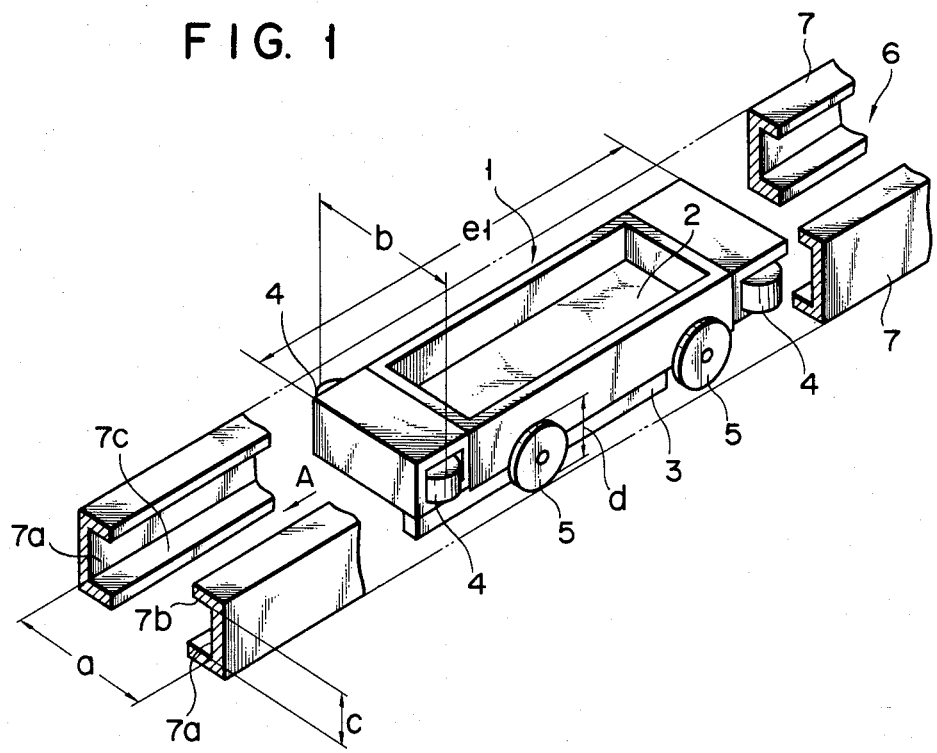
FIG. 1 is a perspective view schematically showing one embodiment of the transport apparatus of the present invention including a first runner.
Figure 2:
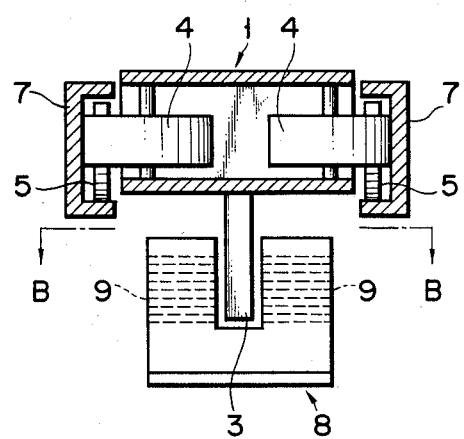
FIG. 2 is a sectional view showing an arrangement of a transport path.

In FIGS. 1 and 2, first runner 1 as an externally driven runner has housing 2 which can carry an article or articles. Reaction plate 3 protrudes downward from the bottom of housing 2. Reaction plate 3 which is a metal plate made of copper, aluminium, etc. is subjected to a forward or reverse impelling force which is attributed to magnetic flux generated by stators 9 mentioned later.

Four first wheels 4 are arranged individually at the front and rear end portions of the lateral faces of housing 2, with respect to traveling direction A of runner 1, so as to to be rotatable around a vertical axis. The peripheral surface of each wheel 4 projects from the width of housing 2. Also, two second wheels 5 are arranged on each side of housing 2 so as to be rotatable around a horizontal axis. Thus, wheels 5 are four in total number. To minimize the coefficient of friction with transport path 6, first and second wheels 4 and 5 are formed of Teflon or Somalite (superhigh molecular polyethylene) rollers.

Transport path 6, along which first runner 1 travels, is formed of a pair of guide rails 7 with a U-shaped cross section which are arranged so that their recessed sides face each other. Distance a between inner upright surfaces 7a of the two rails is a little longer than transverse length b of runner 1 defined by first wheels 4. Distance c between upper and lower opposite surfaces 7b and 7c of each guide rail 7 is a little longer than diameter d of second wheels 5. In FIG. 1, symbol e1 indicates the overall length of first runner 1 in its traveling direction. Upright surfaces 7a constitute guide surfaces for first wheels 4, and opposite surfaces 7b and 7c for second wheels 5.

Figure 3:
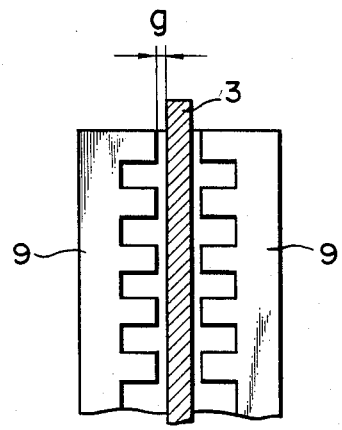
FIG. 3 is a sectional view taken along line B—B of FIG. 2, showing the lower portion of the transport path.
Figure 4A:
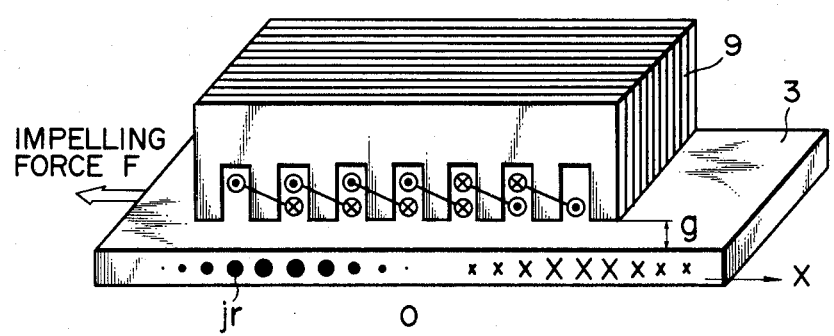
FIGS. 4A and 4B are a perspective view and a diagram, respectively, illustrating the principle of operation of a linear induction motor.

Linear induction motor 8 is disposed under transport path 6. Motor 8 includes reaction plate 3 as a movable element attached to housing 2, and pairs of stators 9 facing each other with path 6 therebetween. As shown in FIGS. 3 and 4A, each stator 9 is a laminated structure including a number of iron sheets which are each formed with teeth on one side edge. A coil is wound around recesses between the teeth. A fixed distance g is kept between reaction plate 3 and stators 9.

Figure 4B:
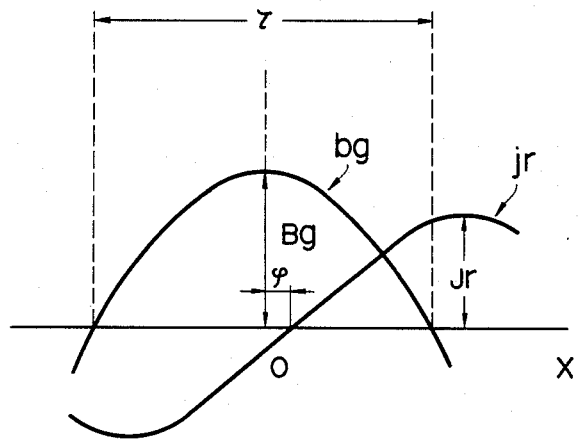

Referring now to FIGS. 4A and 4B, the principle of generation of a forward or reverse impelling force by the linear inductor motor will be explained in brief. If a two- or three-phase AC current is applied to the coils of stators 9, instantaneous value bg (T) of magnetic flux density at gap g is given by $$bg = Bg \cos(\omega t - \pi \chi/\tau),$$

where Bg is the peak value of the magnetic flux density, $\omega(=2\pi f)$ the angular frequency (rad/s) of the power supply, f the frequency (Hz), t the time (s), $\chi$ the distance (m) on the surface of stator, and $\tau$ the pole pitch (w). Pole pitch $\tau$ is equivalent to the half-period length of magnetic flux. Since the magnetic flux generated from stators 9 is AC flux, it causes an eddy current to be produced in reaction plate 3 as a movable element in accordance with the Lenz's law. In FIG. 4A, black spots and crosses marked on a section of plate 3 represent the direction and size, respectively, of the eddy current. If the peak value of the eddy current is Jr, instantaneous value jr of the eddy current is given by $$jr = Jr \sin(\omega t - \pi \chi/\tau - \psi),$$

where $\psi$ is a phase difference based on the impedance of reaction plate 3. Since magnetic flux density bg at gap g forms a shifting magnetic field, the product of density bg and current value jr generates continuous impelling force F in accordance with the Fleming's left-hand rule. This impelling force may be exerted in both horizontal directions of FIG. 4A. In FIG. 4B, however, bg×jr is greater in the left-hand region than in the right-hand region, so that reaction plate 3 is moved to the left of FIG. 4A.

Reaction plate 3 may be subjected to a reverse impelling force by applying a negative-phase AC current to the coils of stators 9. The intensity of impelling force F may be varied by changing AC frequency f or AC amplitude.

Figure 5:
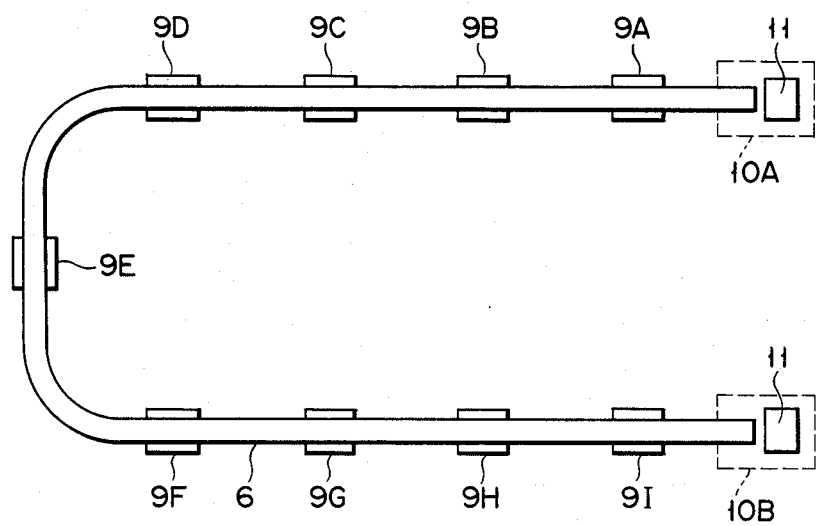
FIG. 5 is a plan view schematically showing the configuration of the transport path.

Referring now to FIG. 5, transport path 6 of first runner 1, subjected to the impelling force in the aforesaid manner, will be described. As shown in FIG. 5, for example, path 6 is U-shaped. Underlying transport path 6, stators 9A to 9I are arranged at predetermined intervals along the path. Thus, first runner 1 can start or stop at any of positions corresponding to stators 9A to 9I. Stations 10A and 10B for second runner 20, as a recovery runner mentioned later, are arranged individually at both ends of U-shaped transport path 6. Stations 10A and 10B are each provided with an input unit 11 for supplying second runner 20 with transport information.

Figure 6:
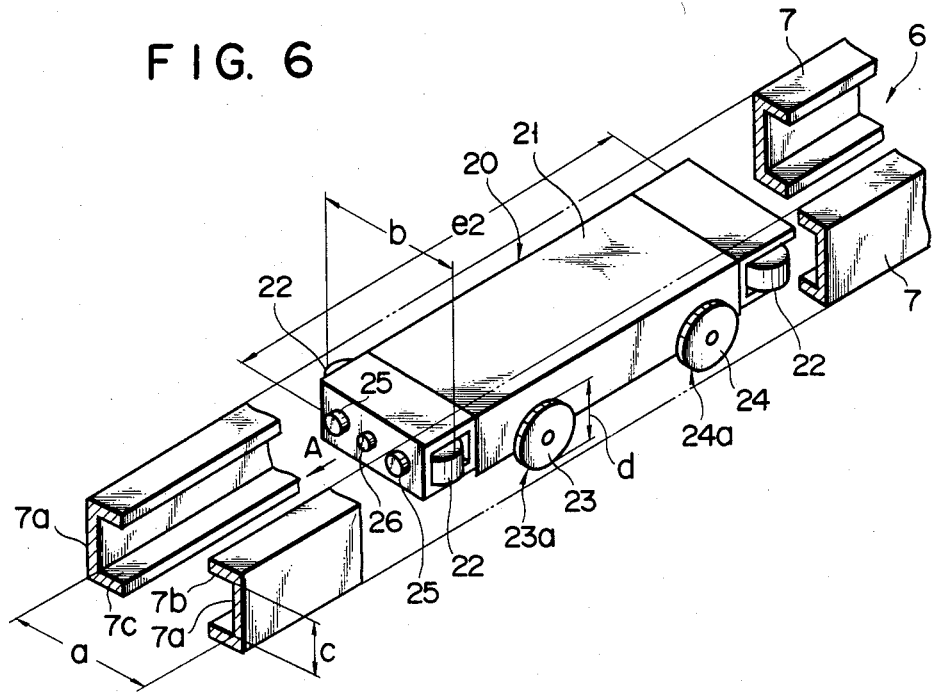
FIG. 6 is a perspective view schematically showing the transport apparatus including a second runner.
Figure 7:
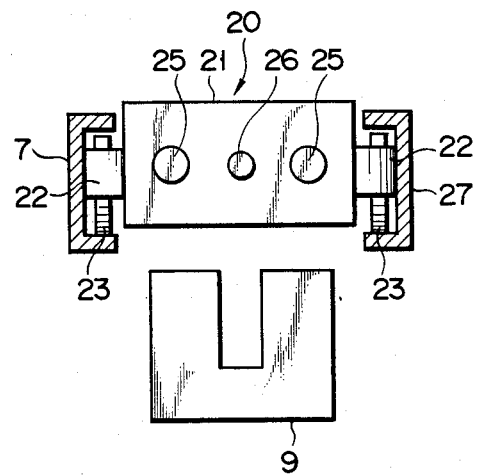
FIG. 7 is a sectional view schematically showing the construction of the second runner.
Figure 8:
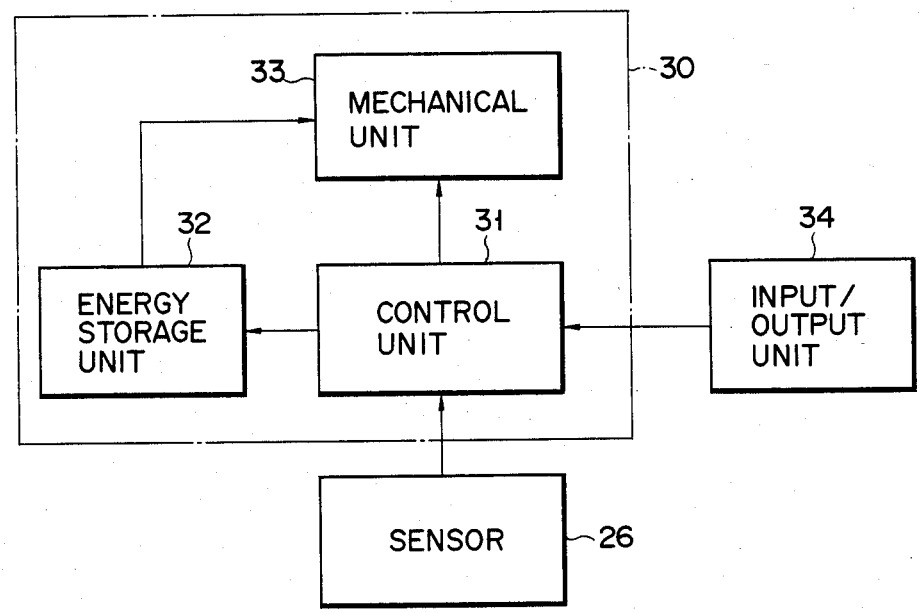
FIG. 8 is a block diagram for illustrating a transport control circuit for the second runner.

Referring now to FIGS. 6, 7 and 8, second runner 20 as the recovery runner will be described in detail.

Second runner 20 can travel along the same guide rails 7 for first runner 1. To this end, runner 20 is provided with all the necessary members for the travel on rails 7, and is equivalent in shape and size to first runner 1. Namely, second runner 20 includes housing 21 containing transport mechanism 30 (described in detail later) therein, first wheels 22 each having a peripheral surface projecting from the width of housing 21, and second and third wheels 23 and 24 arranged on either side of housing 21.

Second wheels 23 are driving wheels which are rotated by a driving force from transport mechanism 30. Wheels 23 frictionally roll on lower guide surfaces 7c of their corresponding guide rails 7, thereby giving an impelling force to second runner 20. The area of rolling contact between second wheels 23 and guide surfaces 7c are equal to that between second wheels 5 of first runner 1 and surfaces 7c. For higher coefficient of friction between wheels 23 and 24 and guide surfaces 7c, the wheels are composed of rubber rollers and formed with notch patterns 23a and 24a on their peripheral surfaces.

Bumpers 25 and sensor 26 are formed on each of the front and rear end faces of housing 21 of second runner 20. Bumpers 25 serve to absorb a shock produced by a collision between the two runners, while sensor 26 detects the presence of first runner 1. Overall length $e_2$ of second runner 1 in its running direction is substantially equal to that ($e_1$) of first runner 20. Thus, transport mechanism 30 is enclosed in housing 21 of length $e_2$. Since second runner 20, unlike the first one, can run by its own driving force without requiring any external impelling force, it is not provided with a reaction plate as a secondary conductor of the stators, as shown in FIG. 7.

Referring now to FIG. 8, transport mechanism 30 will be described in detail.

Mechanism 30 comprises control unit 31 for transport control, energy storage unit 32, and mechanical unit 33 for transport operation. Storage unit 32 may be formed of, for example, storage batteries. Mechanical unit 33 includes a motor supplied with electric power from the batteries, a reduction gear system for properly reducing the motor speed, and a transmission system for transmitting the output of the reduction gear system to the driving wheels.

Second runner 20 is further provided with input/output unit 34 which can communicate with input units 11. Unit 34 and sensor 26 are connected to control unit 31. Input units 11 supply input-output unit 34 with input signals, including start information, starting position information, stop position information, etc. Output signals from unit 34 include, for example, detection information on first runner 1 provided by sensor 26.

The operation of the transport apparatus with the aforementioned construction will now be described.

In applying an impelling force to first runner 1, a two- or three-phase AC current is applied to the coils of stators 9, as mentioned before, to generate magnetic flux from stators 9. Based on the magnetic flux, an eddy current is produced in reaction plate 3. The product of the values of the magnetic flux and the eddy current generates continuous impelling force F in accordance with the Fleming's left-hand rule. Thus subjected to the impelling force, first runner 1 is driven along transport path 6 by the force of inertia in a manner such that wheels 4 and 5 on housing 2 are guided by U-shaped guide rails 7.

By applying a negative-phase current to stators 9, a reverse impelling force is produced in reaction plate 3, so that first runner 1 can be stopped at a position over any of stators 9. It is to be understood that runner 1 can be restarted from any of rest positions on the stators.

In some cases, however, first runner 1 may stop at a position beyond the reach of the impelling force of stators 9. Such a situation may occur when the power supply unit for stators 9 are subject to power failure or malfunction, or in case of an operator's wrong operation.

In these cases, second runner 20 is driven along guide rails 7 to push and move stopped first runner 1 to a position from which runner 1 can restart. To this end, the operator first applies the transport information from input unit 11 to second runner 20. In response to the transport information, control unit 31 actuates energy storage unit 32 and mechanical unit 33. Thereupon, driving wheels 23 are rotated, so that second runner 20 can travel unaided along guide rails 7. Bearing notch patterns 23a and 24a on their peripheral surfaces in contact with rails 7, wheels 23 and 24 are improved in coefficient of friction to ensure a sufficient impelling force.

Second runner 20 stopped in the middle of transport path 6 abuts against first runner 1 with their bumpers 25 directly in contact. Thereafter, first runner 1 moves pushed by second runner 20. By previously determining the stop position of second runner 20, first runner 1 can be relocated in a position for restarting which is located over any of stators 9A to 9I. Then, second runner 20 is returned to station 10A or 10B as a starting position. The transport apparatus can be operated immediately after the returning process in case of the operator's mistake. In case of power failure, the apparatus may be started directly after the restoration of the normal power supply.

The relocation of first runner 1 by means of second runner 20 may be controlled by various methods. For example, first runner 1 is moved to the position over stator 9A or 9I at the end of transport path 6 without regard to the stop position of runner 1. By doing this, the distance covered by second runner 20 started at station 10A or 10B is made constant. Thus, the relocation control is very easy.

Alternatively, the recovery position of first runner 1 may be inputted by means of input unit 11. Further, the stop position of first runner 1 may be detected by sensor 26 of second runner 20 so that first runner 1 is relocated over stator 9 nearest to the detected position.

If first and second runners 1 and 20 run against each other during the relocation, the shock of the collision is absorbed by bumpers 25 on second runner 20. Thus, the article or articles on first runner 1, as well as both runners, can be protected against damage.

As a runner for relocation, second runner 20 runs on guide rails 7 which originally are designed as a track for first runner 1. Despite the use of different drive systems for the two runners, therefore, the transport apparatus does not require any additional rails for second runner 20, thus enjoying simple construction and reduced manufacturing cost.

Although the common track is used for first and second runners 1 and 20, moreover, the efficiency of the inertial run of first runner 1 can be improved by reducing the coefficient of friction between wheels 4 and 5 of runner 1 and guide rails 7. On the other hand, an effective impelling force can be applied to second runner 20 by increasing the coefficient of friction between driving wheels 23 of runner 20 and rails 7.

Transport path 6 is curved at its middle portion. Since path 6 originally is designed for first runner 1, the radius of curvature of the curved portion is determined in consideration of overall length e1 of first runner 1 for its smooth run. Meanwhile, overall length $e_2$ of second runner 20 is substantially equal to length $e_1$ of first runner 1, so that second runner 20 can also smoothly run along transport path 6. To meet this situation, transport mechanism 30 of second runner 20 must be small enough to be contained in housing 21 of overall length $e_2$.

In this embodiment, transport mechanism 30 of an energy-storage type is incorporated in second runner 20. Alternatively, however, the transport energy may be externally supplied, as required, to the transport mechanism. For example, the transport energy or power may be supplied by means of a cable stretched along transport path 6 and a pantograph collector. With use of this arrangement, the space for transport mechanism 30 may be reduced, facilitating the miniaturization of second runner 20. Runner 20 may be driven by various methods in which it can start and stop unaided in accordance with transport information.

It is to be understood that the present invention is not limited to the embodiment described above, and that various changes and modifications may be effected therein by one skilled in the art without departing from the scope or spirit of the invention.

For example, the means for applying the impelling force to first runner 1 may include a linear DC motor, linear pulse motor or other linear motor, besides the linear induction motor. Also, the linear motor may be replaced with various other conventional means which can externally apply the impelling force to the runner.

Figure 9:
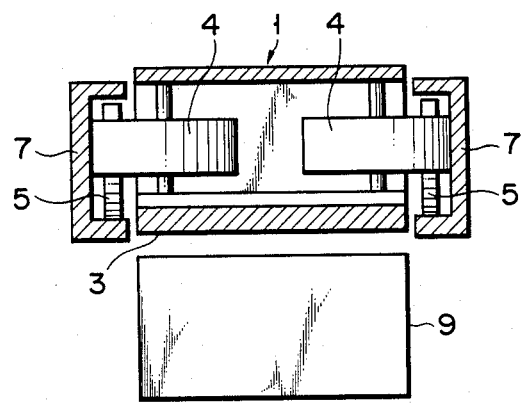
FIG. 9 is a sectional view schematically showing a unilateral linear motor according to a modification of the embodiment of FIG. 1.

Although a bilateral linear motor is used in the above described embodiment, it may be replaced with a unilateral linear motor, as in a modification shown in FIG. 9. In this case, stator 9 and reaction plate 3 extend horizontally, properly spaced and facing parallel to each other. In this arrangement, second runner 20 will constitute a load to hinder the transport operation if it is influenced by the impelling force given by the force exerting mechanism. Preferably, therefore, second runner 20 should be protected against the influence of the impelling force.

Naturally, therefore, second runner 20 is not provided with such a secondary conductor of stator 9 as is used in the foregoing embodiment. When using a unilateral linear motor, moreover, the member to serve as a secondary conductor should preferably be kept away from stator 9 lest it be influenced by the magnetic force of the linear motor. If this cannot easily be achieved, stator 9 may be controlled so as to be deenergized when second runner 20 goes past the stator.

The track for guiding first and second runners 1 and 20 is not limited to the shape described in connection with the embodiment described above, and may be in various other suitable shapes.

Further, second runner 20 of the invention is not limited to the one which serves only for the relocation of first runner 1. Alternatively, it may include a carrier or the like which can convey articles to any desired position.

In the above-mentioned embodiment, moreover, first and second runners 1 and 20 are described as sharing the transport path. Alternatively, however, the transport apparatus may be constructed as shown, as another embodiment, in FIGS. 10 to 14. The apparatus according to the second embodiment will now be described. In the description to follow, like reference numerals are used to designate like portions as included in the first embodiment, and a description of those portions is omitted.

Figure 10:
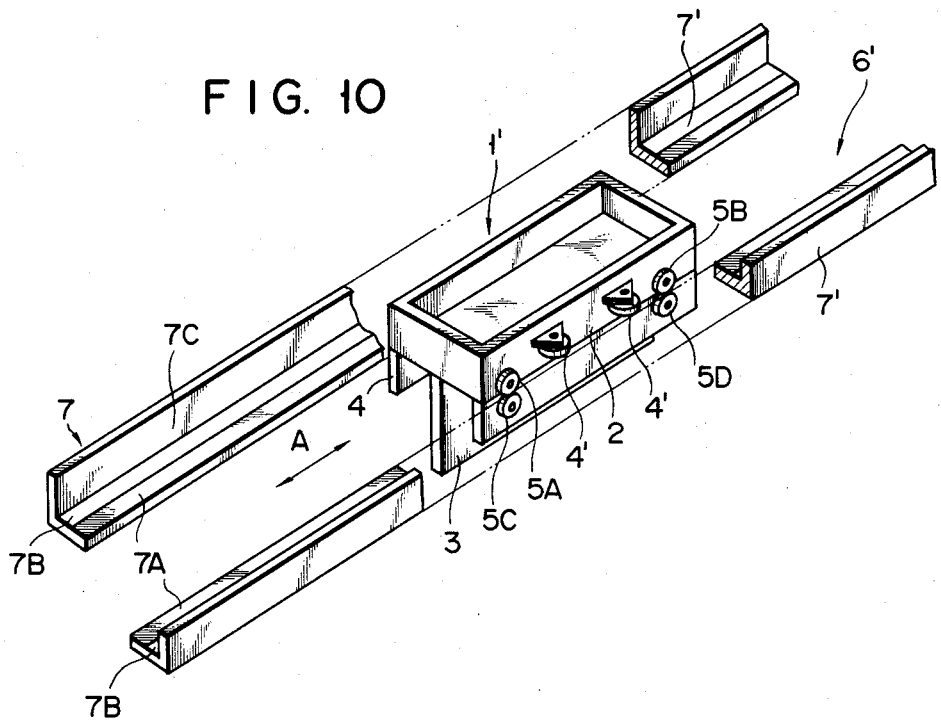
FIG. 10 is a perspective view schematically showing another embodiment of the transport apparatus of the invention including a first runner.
Figure 11:
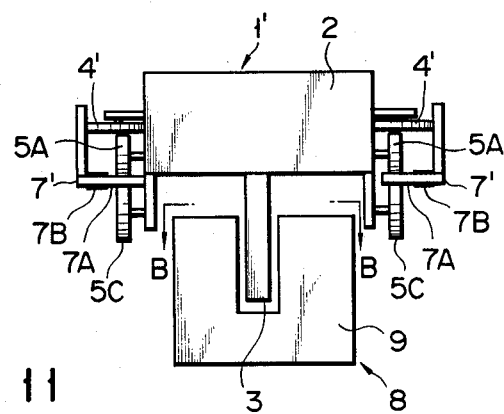
FIG. 11 is a sectional view showing a transport path and the first runner of the transport apparatus of FIG. 10.

As shown in FIG. 10, transport path 6' of first runner 1' is formed of a pair of rails 7' with an L-shaped cross section, spaced and extending parallel to each other. A pair of wheels 5A and 5B are mounted on each lateral face of housing 2 of first runner 1'. Wheels 5A and 5B are in rolling contact with the top surface of their corresponding rail 7'. A mounting plate 4 extends downwardly from the bottom of each lateral wall of housing 2. Wheels 5C and 5D are mounted on each mounting plate 4, spaced and underlying wheels 5A and 5B, respectively. Wheels 5C and 5D are in rolling contact with the undersurface of their corresponding rail 7'.

The distances between the respective outer peripheral surfaces of wheels 5A and 5C and between those of wheels 5B and 5D are a little longer than the wall thickness of rail 7'.

As shown in FIG. 10, moreover, the running surface of each rail 7' includes first running surface 7A on the inside, second running surface 7B on the outside, and guide surface 7C for restraining the transverse movement of first runner 1'. Surfaces 7A and 7C are smooth surfaces, while surface 7B is a rough one. Wheels 5A to 5D are in rolling contact with first running surface 7A.

Two wheels 4' are provided on each lateral face of housing 2 of first runner 1'. Thus, wheels 4' are four in total number. The peripheral surface of each wheel projects from the width of runner 1'. Each two wheels 4' are in rolling contact with guide surface 7C of their corresponding rail 7', leaving a narrow gap between each wheel 4' and surface 7C.

According to this arrangement, first runner 1' can move in the direction indicated by arrow A in FIG. 10, along transport path 6', in a manner such that each rail 7' is held between wheels 5A and 5C and between 5B and 5D. Thus, runner 1' is prevented from running off rails 7' when it turns a curve of the track.

Figure 12:
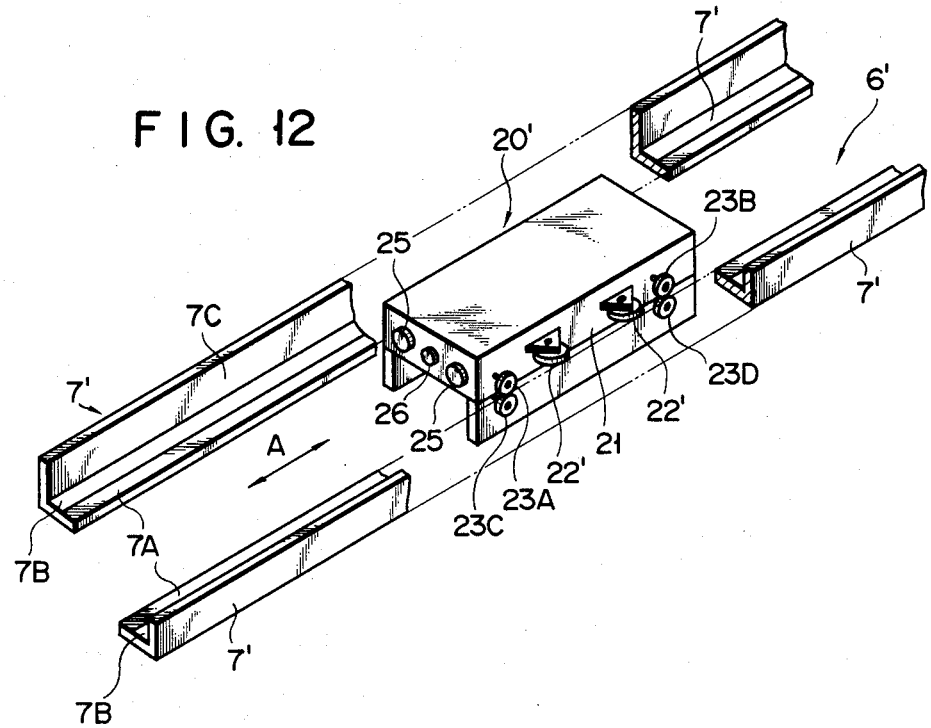
FIG. 12 is a perspective view schematically showing the transport apparatus of FIG. 10 including a second runner.
Figure 13:
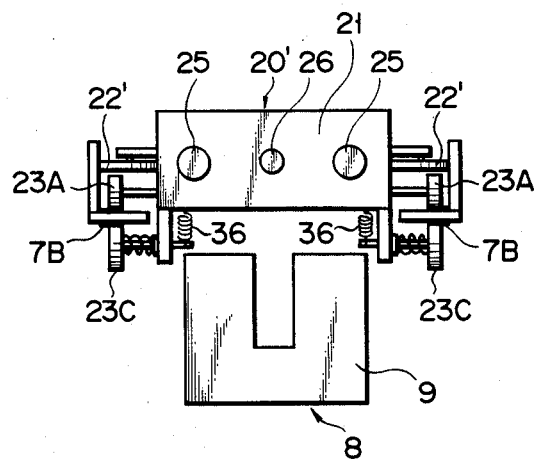
FIG. 13 is a sectional view schematically showing the construction of the second runner of FIG. 12.
Figure 14:
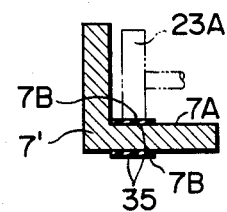
FIG. 14 is a sectional view showing a modification of the second embodiment.

As shown in FIG. 12, second runner 20' includes housing 21 having transport mechanism 30 therein, wheels 22' having their peripheral surface projecting from housing 21, and pairs of vertically facing wheels 23A to 23D mounted on either lateral face of housing 21. Wheels 23A to 23D are in rolling contact with second running surface 7B by a spring 36 (see FIG. 13). Wheels 23A and 23C are driving wheels which are rotated by a driving force from transport mechanism 30. They frictionally roll on second running surfaces 7B of guide rails 7, thereby applying an impelling force to second runner 20'. Wheels 23A and 23C may be formed, on their peripheral surfaces, with notch patterns to increase friction with second running surfaces 7B.

The operation of the transport apparatus of the second embodiment with the above-mentioned construction will now be described.

When an impelling force is applied to first runner 1', as in the first embodiment, runner 1' travels along transport path 6' in a manner such that wheels 5A to 5D and 4' on housing 2 are guided by L-shaped guide rails 7'. In this case, runner 1' is guided by first running surfaces 7A and guide surface 7C which are smooth surfaces, so that the frictional resistance is reduced, improving the efficiency of inertial run.

When second runner 20' runs unaided, on the other hand, driving wheels 23A and 23C are in rolling contact with second running surface 7B which is a rough surface. Therefore, the friction is increased to provide a great enough impelling force for efficient transport.

Thus, although first and second runners 1' and 20' use the common track, they run on their corresponding running surfaces with different coefficients of friction. The efficiency of inertial run of first runner 1' can be improved by reducing the friction between guide rails 7' and wheels 5A to 5D and 4' of runner 1'. On the other hand, the impelling force can more efficiently be applied to second runner 20' by increasing the friction between rails 7' and driving wheels 23A and 23C of runner 20'.

The track for guiding first and second runners 1' and 20' is not limited to the shape described in connection with the second embodiment described above, and may be in various other suitable shapes. Further, the method of changing the coefficient of friction of the running surfaces is not limited to the method of the above embodiment. For example, first and second running surfaces 7A and 7B may be formed of separate members with different coefficients of friction. In this case, high-friction rubber members 35 may be pasted on the rails, as in a modification shown in FIG. 14.

In the two embodiments described above, second runner 20 (29') runs against first runner 1 (1') with bumpers 25 between them, thereby moving runner 1 (1') from a stop position. The present invention is not limited to this arrangement. Instead of using the bumpers, for example, a magnetic attraction mechanism or coupling mechanism may be used to connect the first and second runners so that the first runner is moved in either direction from the stop position as the second runner moves in the same direction. This arrangement permits a returning action of the first runner.

What is claimed is:

1. A transport apparatus, comprising:
   a track including a predetermined transport path;
   a first runner adapted to travel on the transport path when subjected to an external impelling force, said first runner including a first housing, an actuator attached to the first housing and receiving the impelling force from the magnetic field generating means, and set of first wheels rotatably mounted on the first housing and arranged to hold the transport path from both upper and lower sides thereof;
   a plurality of magnetic field generating means arranged at predetermined intervals along the transport path and adapted to produce changes of magnetic fields, whereby an impelling force is applied to the first runner for moving; and
   a second runner including transport means mounted therein for transporting said second runner on the transport path by a driving force.

2. The transport apparatus according to claim 1, wherein said transport path includes a pair of guide rails, said set of first wheels are arranged to hold one guide rail from both upper and lower sides thereof, and said first runner includes another set of first wheels rotatably mounted on the first housing and arranged to hold the other guide rail from both upper and lower sides thereof.

3. The transport apparatus according to claim 2, wherein said first runner includes two sets of guide rollers rotatably mounted on the first housing and placed on the guide rails.

4. The transport apparatus according to claim 1, wherein said second runner includes a second housing contaiing the transport means therein, and a set of second wheels rotatably mounted on the second housing and placed on the transport path, said second wheels being adapted to rotate when subjected to the driving force from the transport means, thereby transporting the second runner on the transport path.

5. The transport apparatus according to claim 4, wherein said first and second wheels run on the same transport path of the track.

6. The transport apparatus according to claim 5, wherein the coefficient of friction between the transport path and the first wheels is smaller than that between the transport path and the second wheels.

7. The transport apparatus according to claim 4, wherein said transport path includes a first transport path on which the first wheels roll and a second transport path on which the second wheels roll.

8. The transport apparatus according to claim 7, wherein the coefficient of friction between the first transport path and the first wheels is smaller than that between the second transport path and the second wheels.

9. The transport apparatus according to claim 4, wherein said set of second wheels are arranged to hold the transport path from both upper and lower sides thereof.

10. The transport apparatus according to claim 9, further comprising urging means for urging the second wheels on the lower side of the transport path toward the transport path.

11. The transport apparatus according to claim 10, wherein said urging means include a coil spring.

12. The transport apparatus according to claim 1, wherein said transport means controls the second runner so that the second runner starts and stops in accordance with input information.

13. A transport apparatus, comprising:
a track including a predetermined transport path;
a first runner adpated to travel on the transport path when subjected to an external impelling force;
a plurality of magnetic field generating means arranged at predetermined intervals along the transport path and adapted to produce changes of magnetic fields, whereby an impelling force is applied to the first runner for moving; and
a second runner including transport means mounted therein for transporting said second runner on the transport path by a driving force, said second runner including a housing containing the transport means therein, and a set of wheels rotatably mounted on the housing and placed on the transport path, said wheels being arranged to hold the transport path from both upper and lower surfaces thereof and being adapted to rotate when subjected to the driving force from the transport means, thereby transporting the second runner on the transport path.

14. The transport apparatus according to claim 1, wherein said second runner includes a bumper at a front face thereof for engaging said first runner.

* * * * *